United States Patent Office 3,074,665
Patented Jan. 22, 1963

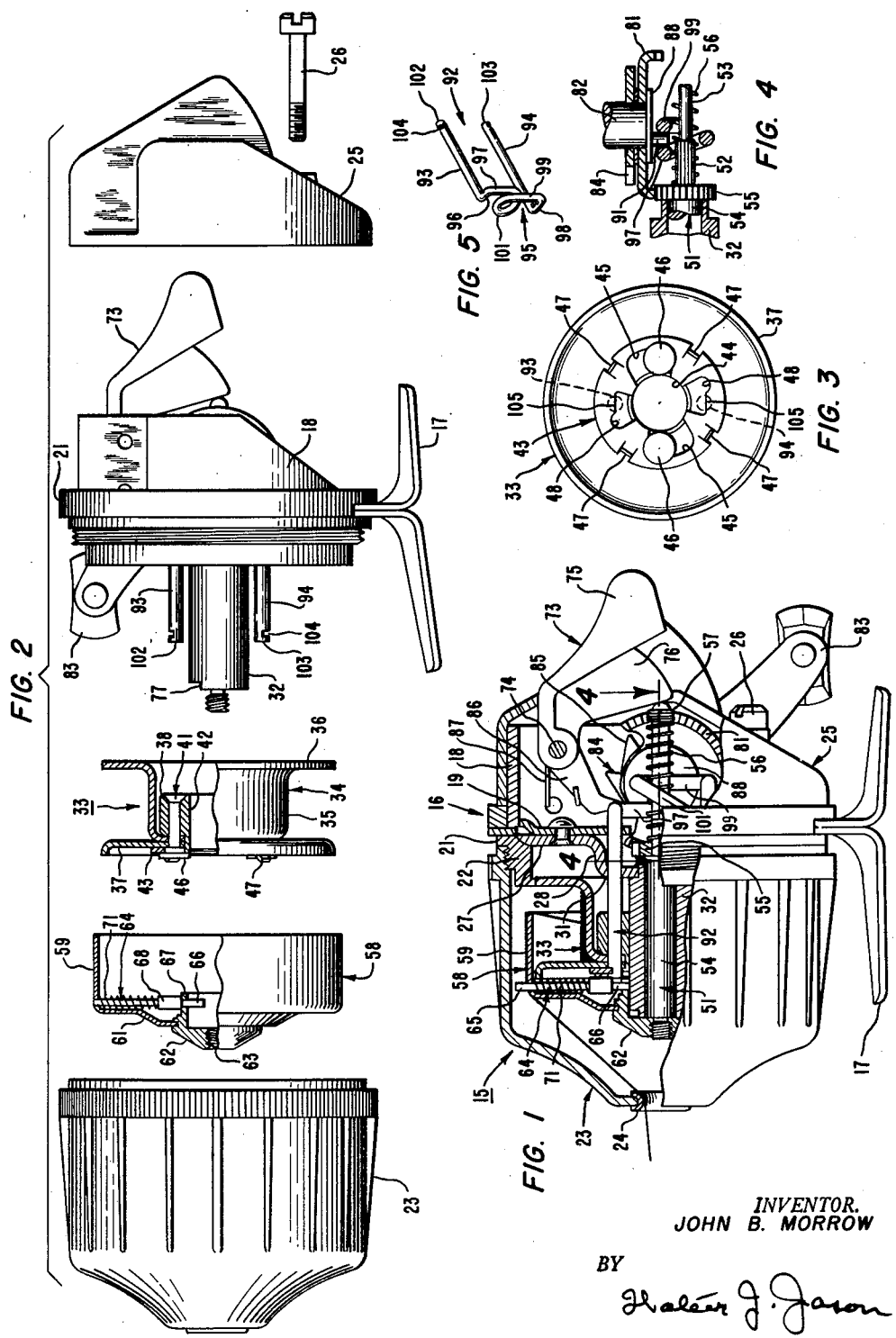

3,074,665
FISHING REEL WITH RECIPROCATED SPOOL
John B. Morrow, La Mesa, Calif., assignor, by mesne assignments, to Brunswick Corporation, Chicago, Ill., a corporation of Delaware
Filed July 27, 1960, Ser. No. 45,627
4 Claims. (Cl. 242—84.21)

The present invention relates to fishing reels and more particularly to an improved construction for fishing reels of the spinning reel type wherein the line spool is non-rotating and is mounted for reciprocal movement and cooperates with a rotative line-winding cowl.

An object of the present invention is to provide an improved spinning reel embodying novel actuating means for effecting reciprocating movement of the line spool.

Another object of this invention resides in providing simple, efficient and unique actuating structure which assists in locating the line spool in proper operative relationship to a line-winding cowl.

Another object of this invention is to provide a spinning reel which is sparing in the number of its parts, efficient in operation and inexpensive to manufacture.

Other objects and features of this invention will be readily apparent to those skilled in the art from the following specification and appended drawings illustrating a certain preferred embodiment of the invention in which:

FIGURE 1 is a side elevational view, partly in section, of a spinning reel in accordance with the present invention;

FIGURE 2 is an exploded view in side elevation of the present reel with the cowl and spool shown in partial section and the spool being rotated a quarter turn from its normal position for illustrative purposes;

FIGURE 3 is a front elevational view of the line spool;

FIGURE 4 is a fragmentary sectional view taken along the line 4—4 of FIGURE 1; and FIGURE 5 is a perspective view of the spool actuator.

Particular reference will now be had to the drawings wherein the spinning reel as an assembled device is indicated in its entirety by the numeral 15. Spinning reel 15 comprises a housing 16 having extending therefrom a mounting bracket or reel support 17 by means of which reel 15 may be secured, in conventional manner, to a fishing rod.

Housing 16 includes a frame 18, a base plate 19 and a surrounding annular ring portion 21, all suitably connected into a rigid structure. Ring portion 21 includes a forwardly extending annular flange 22 a portion of the outer surface of which is threaded for the ready removable attachment thereto of a cover 23. Cover 23 is of generally frusto-conical configuration and has a line guide bushing 24 fixedly fitted into an opening located at its apex through which the fishing line extends.

Fitted over and in surrounding relation to frame 18 is a generally cup-shaped closure member 25 which is secured to frame 18 by a screw 26.

Disposed forwardly of frame 18 and within the space defined by ring 21 is a plate member 27 which is connected in place to base plate 19 by rivets. Plate member 27 includes a central, forwardly projecting, generally cup-shaped portion 28 having an opening in the base wall 31 thereof into which is fitted and appropriately secured one end of a sleeve-like bearing 32. Movably fitted upon bearing 32 is a line spool 33. Line spool 33 comprises an element 34 which includes a generally cup-shaped portion 35 and an annular end flange 36. The cup-shaped portion serves as a hub upon which the fishing line is wound. Opposed to end flange 36 is an annular end flange plate 37 and disposed within hub portion 35 is a cylindrical core member 38. End flange plate 37 and core member 38 are secured together and to element 34 by flare rivets 41. Bearing sleeve 32 passes through bore 42 of core member 38 to movably mount line spool 33 thereupon. Line spool 33 is restrained against rotative movement upon bearing sleeve 32 and is limited to rectilinear movement therealong in a manner to be described hereinafter.

Upon the forward face of spool 33 at the end flange plate 37 is rotatably mounted a lock ring 43. Lock ring 43 has a central opening 44 through which the bearing sleeve 32 passes and includes a pair of oppositely located slots 45 through which flare rivets 41 extend. Heads 46 of rivets 41 hold lock ring 43 to spool 33 but these heads are so spaced from the face of end flange 37 that movement of the lock ring 43 is permitted, with defining edges of the slots 45 riding on shank portions of the rivets 41 to provide the desired rotative movement. A plurality of projecting prongs 47 are provided on lock ring 43 which may be grasped by the hand to effect the rotation of lock ring 43. Lock ring 43 includes a second pair of slots 48 which are disposed on opposite sides of central opening 44 and approximately 90° from the first mentioned pair of opposed slots 45. The purpose of slots 48 will be later described.

Journalled for movement within sleeve-like bearing 32 is an elongated rotatable and rectilinearly movable drive shaft 51. Shaft 51 includes a splined portion 52 and a portion 53 both of smaller diameter than the shaft portion 54 which rests within bearing 32. Portions 52 and 53 extend within the gear chamber defined by the walls of frame 18. Upon splined portion 52 of shaft 51 there is mounted a pinion 55 which rotates with shaft 51 and is adapted to move rectilinearly along the splined portion 52. Disposed in encircling relationship upon shaft portions 52 and 53 is a return spring 56 which extends between pinion 55 and a retaining ring 57 carried by shaft portion 53 and serves a purpose to be described.

The outer end of shaft 51 is threaded to mount an annular, generally cup-shaped cowl 58. Cowl 58, as shown, comprises an annular wall or flange 59 and a base 61. Base 61 has a central opening which is closed by a plug member 62 having a threaded bore 63 for accommodating the threaded end of shaft 51 to affix the cowl 58 to shaft 51 for rotative movement therewith. Cowl 58 is disposed as shown, adjacent spool 33 and its annular flange 59 fits over end flange 37 and encircles a portion of hub 35 of spool 33.

A line pick-up pin 64 is movably carried by cowl 58. The outer or upper end 65 of pin 64 is adapted to project to the exterior of cowl 58 through an opening in annular flange 59. The lower end 66 projects downwardly through an opening in a flange 67 of plug member 62. Pin 64 includes an enlarged central portion 68 which is adapted to rest upon plug flange 67.

A spring 71 disposed on pick-up pin 64 between the inner surface of cowl flange 59 and enlarged pin portion 68 exerts its bias to urge this pin portion 68 toward engagement with plug flange 67 and to urge the upper pin end 65 for withdrawal within its opening in cowl flange 59.

When cowl 58 occupies the position shown in FIGURE 1, the lower end 66 of pick-up pin 64 will ride upon the exterior surface of bearing sleeve 32 and enlarged pin portion 68 will be spaced, against the bias of spring 71, away from plug flange 67. At this time, the upper end 65 of pin 64 will project through its opening to the exterior of cowl 58 into its line pick-up position.

Cowl 58 is adapted to be bodily displaced longitudinally relative to spool 33 and bearing sleeve 32 upon longitudinal displacement of the shaft 51 to carry the lower end 66 of pin 64 beyond the outer end face of bearing sleeve 32 whereby the bias of spring 71 will move pin 64 downwardly to bring enlarged pin portion 68 into engagement with plug flange 67 and to withdraw the upper end 65 of pin 64 completely within its opening in cowl flange 69.

This displacement of cowl 58 and drive shaft 51 is effected by an actuating lever 73 which is pivotally secured to housing frame 18 by pivot pin 74. Actuating lever 73 extends from within frame 18 through aligned openings in the frame 18 and closure member 25. Actuating lever 73 embodies a thumb portion 75 which is located in position for ready manipulation by the thumb of the fisherman.

At the underside of actuating lever 73 there is provided an integral projecting portion 76 which engages the end of shaft portion 53. Upon the application of thumb pressure to actuating lever 73 shaft 51 will be longitudinally shifted to the left, as viewed in FIGURE 1, against the bias of spring 56. Splined portion 52 of shaft 51 shifts for a portion of its length relative to pinion 55 which abuts the inner end of bearing sleeve 32 and does not change location and spring 56 is thus compressed between pinion 55 and ring 57. The movement afforded to shaft 51 by actuating lever 73 is sufficient to carry the lower end of pick-up pin 64 beyond the outer face of bearing sleeve 32 to permit pick-up pin 64 to drop as above described.

Bearing sleeve 32 at its outer end is provided with a camming ledge 77 which is adapted to be engaged by the lower end 66 of pick-up pin 64 for moving it from inoperative to operative position. When pressure is removed from actuating lever 73 shaft 51 moves to the right under the bias of spring 56 to carry cowl 58 and its pick-up pin 64 to the bearing sleeve 32. Thereafter rotation of cowl 58 will bring pin end 66 into engagement with camming ledge 77. End 66 is adapted to ride upon this ledge until it moves back atop sleeve 32 at which time pick-up pin 64 will again be projected to the exterior of cowl 58.

As stated hereinabove, drive shaft 51 extends within the gear chamber formed by frame 18 and carries a pinion 55. Pinion 55 meshes with a generally cup-shaped gear 81 to be driven thereby to effect rotation of drive shaft 51 and cowl 58 carried thereby. Gear 81 is suitably secured to the inner end of a crank shaft 82 which is suitably journalled for movement in a bearing (not shown) carried by frame 18. A conventional handle 83 is suitably connected to crank shaft 82 and is manually actuable to effect rotative movement of crank shaft 82 and its gear 81.

Crank shaft 82 suitably mounts a ratchet wheel 84 for common movement therewith and is disposed inwardly of gear 81 and embodies teeth 85 which are adapted to cooperate with a pivotal anti-reverse pawl 86 to limit the free rotative movement of handle 83 and its associated shaft 82 and gear 81 to one direction. Pawl 86 is pivotally mounted upon pin 74, which also mounts actuating lever 73, and is biased by a spring 87, carried by frame 18, toward engagement with ratchet wheel 84. Ratchet wheel 84 may freely rotate with crank shaft 82 in one direction only to permit line-winding manipulation of handle 83 because the teeth 85 thereof are so designed as to present sloping rear edges which cam against and move pawl 86 out of the path of movement. When movement of the handle 83 is attempted in the opposite direction the forward edges of teeth 85 will engage the outer end of pawl 86 and thereby prevent further rotative movement of the handle 83.

Affixed to the end of crank shaft 82 for common movement therewith is a disc 88 which lies within the recess of cup-shaped gear 81 and which fixedly carries an eccentrically located, forwardly projecting pin 91. Eccentric pin 91 extends into engagement with an actuator 92 for effecting movement thereof. Actuator 92 connects with and serves to effect rectilinear movement of spool 33.

Actuator 92 is formed of a single length of spring wire bent into a generally U-shape to provide a pair of opposed, parallel, elongated leg portions 93 and 94 interconnected at their inner ends by a base portion 95. Base portion 95 includes a lateral portion 96 which extends outward from leg 93 and merges into a depending straight wire portion 97 which lies normal to leg 93. Base portion 95 also includes a second lateral portion 98 which extends outward from leg 94 and merges into an upwardly projecting straight wire portion 99 which is normal to leg 94. Straight wire portions 97 and 99, as shown, extend from their associated leg portions 93 and 94 in opposite directions and lie in the same plane parallel one to the other and spaced apart. Straight wire portions 97 and 99 merge into and are interconnected by a loop portion 101. Leg portions 93 and 94 adjacent their respective exterior ends 102 and 103 are notched as at 104.

Actuator 92 has its base portion 95 disposed within the gear chamber of frame 18 where eccentric pin 91 projects from disc 88 into the space between straight wire portions 97 and 99 and provides a force alternatively to these portions upon rotative movement of disc 88 to effect rectilinear movement of actuator 92.

Legs 93 and 94 of actuator 92, as shown, are disposed on either side of bearing sleeve 32 and lie parallel to drive shaft 54 centrally disposed therebetween. The portion of shaft 54 disposed in the gear chamber of frame 18 extends longitudinally and freely through loop portion 101 and it is apparent that actuator 92 and shaft 54 offer no interference to one another's movements.

Legs 93 and 94 extend forwardly from gear chamber of frame 18 and each projects through and is slidably supported within a series of aligned openings in base plate 19, base portion 31 of plate 27, spool core 38, the base of spool hub 35 and end flange 37 to extend their outer ends 102 and 103 beyond the forward face of end flange 37. Outer ends 102 and 103 respectively of legs 93 and 94 project through the slots 48 of lock ring 43. Connection of legs 93 and 94 to lock ring 43 is effected by manual rotation of lock ring 43 to dispose or fit edge surfaces 105 of slots 48 within notches 104. With edge surfaces 105 located within notches 104 it is apparent that legs 93 and 94 cannot be moved independently of spool 33 and actuator 92 and spool 33 are thus interconnected for common movement.

It is also apparent that the movement of actuator 92 and spool 33 is a reciprocating movement since the legs 93 and 94, passing through their associated aligned openings, are confined to a sliding movement. Thus, actuator 92 effects to-and-fro movement of spool 33 and restrains it against rotative movement upon its support, the bearing sleeve 32.

With lock ring 43 connected to legs 93 and 94 of actuator 92 structural rigidity is afforded wire form actuator 92 and it effectively performs its required function of transmitting the actuating force provided by eccentric pin 91.

To disconnect actuator 92 from spool 33 it is necessary only to manually rotate lock-ring 43 in clock-wise direction, as viewed in FIGURE 3, to move edge surfaces 105 out of notches 104 and present an open area of slots 48 about the ends of legs 93 and 94.

The use of a lock ring 43 to effect connection between spool 33 and actuator 92 permits the ready attachment and removal of spool 33 from the reel. There are instances when a fisherman may desire to use lines of different weights in his fishing efforts and with the present construction it is a simple matter for him to remove the spool that may be present in the reel and replace it with a spool carrying a line of the weight he desires.

In describing the operation of the present reel it will be assumed that the reel is in its rewinding position as shown in FIGURE 1 and the fisherman desires to make a cast. In making his casting motion the fisherman presses his thumb upon actuating lever 73 which effects longitudinal movement of drive shaft 51 to displace cowl 58. Pick-up pin 64 will move off of bearing sleeve 32 and drop into its retracted position. The fishing line will feed from spool 33 under the pull of the lure at the end of the fishing line. Pick-up pin 64, being retracted, offers no interference to the free feed of the line from spool 33. Conical cover 23 serves to prevent the line from spiraling as it feeds from the spool and keeps it free of the rod.

When the fisherman desires to rewind the line he removes his thumb from lever 73 and begins rotation of handle 83. Rotation of handle 83 will rotate crank shaft 82 to rotate gear 81 and disc 88. Gear 81 will drive pinion 55 to effect rotation of drive shaft 51 and cowl 58. Pick-up pin 64 will ride back up onto bearing sleeve 32 to project its upper end to the exterior of cowl 58. Pick-up pin 64, in its extended position, will on continued rotation of handle 83 engage the fishing line and rewind it onto spool 33 which is concentrically positioned relative to cowl 58.

Since disc 88 and gear 81 are carried by crank shaft 82 for common movement therewith there will be simultaneous actuation of actuator 92 and drive shaft 51. As described gear 81 rotates drive shaft 51 to rotate cowl 58. At the same time eccentric pin 91 carried by disc 88 moves in the space between straight wire portions 97 and 99 of actuator 92 to press alternately against these portions to effect to-and-fro or reciprocating longitudinal movement of actuator 92. This movement is transmitted by actuator 92 to spool 33 so that as cowl 58 feeds the fishing line onto spool 33, spool 33 simultaneously reciprocates to cause the fishing line to be wound neatly and efficiently upon the spool 33 over the span of its hub.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

What I claim is.

1. In a fishing reel, a frame, a stationary bearing sleeve, means interconnecting said bearing sleeve and said frame, a non-rotative line-carrying spool slidably positioned on said bearing sleeve, a rotatable drive shaft projecting through said bearing sleeve, a line-winding member carried by said drive shaft in concentric relation to said spool, a pinion carried by said drive shaft, a rectilinearly movable actuator, said actuator comprising a generally U-shape wire element having opposed, elongated leg portions and a base portion, said leg portions being connected to said spool, said base portion comprising spaced-apart runs of wire, a rotatable crank carried by said frame, a drive gear operated by said crank and meshing with said pinion to rotate said line-winding member, and an eccentric pin member operated by said crank and engaging with said spaced-apart runs of wire of said actuator for effecting reciprocating movement thereof and of said spool simultaneously with the rotation of said line-winding member.

2. In a fishing reel, a frame, a stationary bearing sleeve, means interconnecting said bearing sleeve and said frame, a non-rotative line-carrying spool slidably positioned on said bearing sleeve, a rotative drive shaft projecting through said bearing sleeve, a line-winding member carried by said drive shaft in concentric relation to said spool, a pinion carried by said drive shaft, a rectilinearly movable actuator, said actuator comprising a generally U-shape wire element having opposed, elongated leg portions and a base portion, said base portion comprising spaced-apart runs of wire interconnected by a loop of wire, said leg portions extending parallel to and on opposite sides of said drive shaft and being connected to said spool, said drive shaft extending freely through said loop portion, a rotatable crank carried by said frame, a drive gear connected to and operated by said crank, and a projecting pin eccentrically located on said disc and engaging with said spaced-apart runs of wire of said actuator for effecting reciprocating movement thereof and of said spool simultaneously with the rotation of said line-winding member.

3. In a fishing reel, a frame, a stationary bearing sleeve, means interconnecting said bearing sleeve and said frame, a non-rotative line-carrying spool slidably positioned on said bearing sleeve, a rotatable drive shaft projecting through said bearing sleeve, a line-winding member carried by said drive shaft in concentric relation to said spool, a pinion carried by said drive shaft, a rectilinearly movable actuator, said actuator comprising a generally U-shape wire element having opposed, elongated leg portions and a base portion, said base portion comprising spaced-apart runs of wire, locking means movably carried by said spool for readily, releasably connecting said leg portions to said spool for common movement of said actuator and said spool, a rotatable crank carried by said frame, a drive gear mounted to and operated by said crank and meshing with said pinion to rotate said line-winding member, a disc connected to and operated by said crank, and a projecting pin eccentrically mounted on said disc and engaging with said spaced-apart runs of wire of said actuator for effecting reciprocating movement thereof and of said spool simultaneously with the rotation of said line-winding member.

4. In a fishing reel, a housing, a stationary bearing sleeve mounted therein, a non-rotative line-carrying spool slidably positioned on said bearing sleeve, a rotatable drive shaft projecting through said bearing sleeve, a line-winding member carried by said drive shaft in concentric relation to said spool, a pinion carried by said drive shaft, a rectilinearly movable actuator, said actuator comprising a generally U-shape wire element having opposed, elongated leg portions and a base portion, said base portion comprising spaced-apart runs of wire, means releasably connecting said leg portions to said spool, a rotatable crank carried by said frame, a drive gear operated by said crank and meshing with said pinion to rotate said line-winding member, and an eccentric pin member operated by said crank and engaging with said spaced-apart runs of wire of said actuator for effecting reciprocating movement thereof and of said spool simultaneously with the rotation of said line-winding member.

References Cited in the file of this patent

UNITED STATES PATENTS

| | | |
|---|---|---|
| 2,537,590 | Kaufman | Jan. 9, 1951 |
| 2,705,113 | Bonanno | Mar. 29, 1955 |
| 2,711,292 | Taggart et al. | June 21, 1955 |
| 2,724,563 | Shakespeare et al. | Nov. 22, 1955 |
| 2,745,607 | Taggart et al. | May 15, 1956 |
| 2,854,200 | Montgomery | Sept. 30, 1958 |
| 2,862,679 | Denison et al. | Dec. 2, 1958 |
| 3,000,586 | Mandolf | Sept. 19, 1961 |

FOREIGN PATENTS

| | | |
|---|---|---|
| 473,239 | Great Britain | Oct. 8, 1937 |

OTHER REFERENCES

Nurmse, German printed publication 1,074,317, printed Jan. 28, 1960 (KL. 45h 89/02), 2 pp. spec., 1 sheet of drawing.